United States Patent
Sugiyama

[19]

[11] Patent Number: 6,127,618
[45] Date of Patent: Oct. 3, 2000

[54] KARAOKE APPARATUS IMPROVING SEPARATION BETWEEN MICROPHONE SIGNAL AND MICROPHONE SOUND EFFECT SIGNAL

[75] Inventor: Motohiro Sugiyama, Hamamatsu, Japan

[73] Assignee: Yamaha Corporation, Hamamatsu, Japan

[21] Appl. No.: 09/359,080

[22] Filed: Jul. 22, 1999

[30] Foreign Application Priority Data

Jul. 24, 1998 [JP] Japan .................................. 10-209266

[51] Int. Cl.$^7$ ............................... G09B 5/00; G10H 1/00
[52] U.S. Cl. .................. 84/626; 84/DIG. 1; 84/DIG. 27; 434/307 A
[58] Field of Search ...................... 84/609–614, 625–633, 84/DIG. 1, DIG. 27; 434/307 A

[56] References Cited

U.S. PATENT DOCUMENTS

| | | | |
|---|---|---|---|
| 5,686,684 | 11/1997 | Nagata et al. | 84/631 |
| 5,741,992 | 4/1998 | Nagata | 84/631 |
| 5,773,744 | 6/1998 | Nagata | 84/610 |
| 5,811,707 | 9/1998 | Kakehashi et al. | 84/610 |
| 5,811,708 | 9/1998 | Matsumoto | 84/610 |
| 5,902,950 | 5/1999 | Kato et al. | 84/610 |

*Primary Examiner*—Stanley J. Witkowski
*Attorney, Agent, or Firm*—Pillsbury Madison & Sutro LLP

[57] ABSTRACT

A microphone signal is branched into a microphone sound effect generation signal path and a direct sound signal path via a microphone volume controller. The microphone signal branched to the microphone sound effect generation signal path is level-adjusted by a microphone sound effect volume controller, and then supplied to a microphone sound effect generating circuit, so that a microphone sound effect signal is generated. The microphone sound effect signal and a music signal supplied from a music signal input terminal are additively combined together by combining circuits and are output from a music signal output terminal. The microphone sound branched to the direct sound signal path is output from a microphone signal output terminal, independently of the microphone sound effect signal, improving the separation between the microphone sound signal and a microphone sound effect signal.

18 Claims, 3 Drawing Sheets

KARAOKE APPARATUS IMPROVING SEPARATION BETWEEN MICROPHONE SIGNAL AND MICROPHONE SOUND EFFECT SIGNAL

BACKGROUND OF THE INVENTION

1. Field of the Invention

The present invention relates to a karaoke apparatus. More particularly, the present invention relates to a karaoke apparatus in which the separation between a microphone signal containing a voice of the singer and a sound effect based on the microphone signal is improved, that is, an apparatus in which the sound image localization of each of the microphone signal and the microphone signal sound effect signal is improved.

2. Description of the Related Art

FIGS. 5 and 6 are diagrams respectively showing signal processing systems for a music signal sound (reproduced accompaniment sound) and a microphone input sound in a conventional karaoke apparatus.

FIG. 5 shows a configuration example of a channel reproduction system. A microphone signal which is output from a microphone 10 is input to a microphone signal input terminal 12, passed through a head amplifier 14, and then level-adjusted by a microphone volume controller (attenuator) 16. The level-adjusted microphone signal is branched into a microphone sound effect generation signal path 18 and a direct sound signal path 20. The microphone signal branched to the microphone sound effect generation signal path 18 is level-adjusted by a microphone sound effect volume controller 22, and then supplied to a microphone sound effect generating circuit 24, so that a microphone sound effect signal (an echo, a reverberation signal, or the like) is generated. A combining circuit 26 additively combines the microphone signal (direct sound signal from the singer) and the microphone sound effect signal.

A music signal which is input to a music signal input terminal 42 is branched into a field sound effect generation signal path 48 and a direct sound signal path 50. The music signal branched to the field sound effect generation signal path 48 is supplied to a digital signal processing (DSP) circuit 54 and a field sound effect signal (such as a reverberation field sound effect signal, or a sound image localization sound effect signal) is generated.

Combining circuits 56 additively combine the direct sound passing through the direct sound signal path 50, and the field sound effect signal generated by via the DSP 54.

All microphone signals output from the combining circuit 26 and all music signals output from the combining circuits 56 are additively combined together with respect to each channel (right channel in (Rch IN) and left channel in (Lch IN)) by combining circuits 28. The synthesized signals are level-adjusted by total volume controllers 30, and then amplified by amplifiers 32 to be acoustically reproduced from loudspeakers 34.

FIG. 6 shows a configuration example of a four-channel reproduction system. A microphone signal which is output from a microphone (not shown) is input to a microphone signal input terminal 12, supplied through a head amplifier (not shown), and then level-adjusted by a microphone volume controller (not shown). The level-adjusted microphone signal is branched into a microphone sound effect generation signal path 18 and a direct sound signal path 20. The microphone signal branched to the microphone sound effect generation signal path 18 is level-adjusted by a microphone sound effect volume controller (not shown), and then supplied to a microphone sound effect generating circuit 24, so that a microphone sound effect signal (an echo, a reverberation signal, or the like) is generated. A music signal that is input to a music signal input terminal 42 is branched into a field sound effect generation signal path 48 and a direct sound signal path 50. The music signal branched to the field sound effect generation signal path 48 is supplied to a DSP circuit 54 and four-channel field sound effect signals (such as a reverberation field sound effect signal, or a sound image localization sound effect signal) are generated.

Combining circuits 56 additively combine the direct sound passing through the direct sound signal path 50, and the front two-channel signals of the field sound effect signal.

Combining circuits 27 additively combine the rear two-channel signals of the field sound effect signal and the microphone sound effect signal. Output signals of the circuits are level-adjusted as required by volume controllers (not shown), and then amplified by amplifiers (not shown) to be acoustically reproduced from rear two-channel loudspeakers (not shown).

Outputs of the combining circuits 56 are used as the front two-channel signals of the sound signal. The outputs are additively combined with the microphone sound effect signal for each of the front channels by combining circuits 28. The synthesized signals are further additively combined with the microphone signal of the direct sound signal path 20, by combining circuits 29. The outputs of the additive combining circuits 29 are level-adjusted by volume controllers (not shown), and then amplified by amplifiers (not shown) to be acoustically reproduced from front two-channel loudspeakers (not shown).

In the signal processing configurations shown in FIGS. 5 and 6, the microphone signal is not independently reproduced. Instead, the microphone signal is additively combined with the microphone sound effect signal and the music signal. From the viewpoint that the production of a microphone sound effect signal enables various kinds of effects to be produced in the microphone signal, such configurations are valuable. However, such configurations or the like have a problem in that separation of the microphone signal is in general so poor that vocals become vague.

The primary cause of the problem has been analyzed and studied. It has been discovered that there is interference between a microphone signal and a microphone sound effect signal.

Usually, a microphone sound effect signal is produced by, for example, delaying an echo, reverberation, or the like with respect to a microphone sound, i.e., an input signal. Such a sound effect signal is basically produced on the basis of a microphone sound which is an input signal, and hence has a waveform which is very similar to that of the original microphone sound. This will be discussed in more detail. The production of a sound effect signal is realized by applying various kinds of filtering processes (BPF, LPF, and HPF), or a delay process on an input signal, or, as required, performing a gain control on the input signal. Eventually, the resulting signal cannot be a signal which is quite unlike the input signal. Therefore, a sound effect signal is often delayed in time with respect to a microphone signal and different from a microphone sound in amplitude, but has a waveform which is similar to that of the microphone sound.

Consequently, a sound effect signal is occasionally produced in which a microphone sound effect signal has a phase difference of 180° C. with respect to the original microphone sound signal. In this case, the microphone sound signal and the microphone sound effect signal are different in amplitude from each other but very similar in waveform, and hence the addition of the two sound signals causes the microphone sound signals to be canceled. This is not preferable from the viewpoints of electric properties and psychoacoustics.

In the related configurations, both the microphone signal and the music signal are subjected to additive combination and then output. Although the possibility is low, there may arise a case where, when the music signal contains a component which cancels the microphone signal, the microphone signal is considerably varied.

In both the signal processing configurations of FIGS. 5 and 6, only one kind of sound is generated as the microphone sound effect. Even when the microphone sound effect signal is reproduced by two or four loudspeakers, there arises another problem in that the sound image localization of the microphone sound effect signal is always positioned at the center of the arrangement of the loudspeakers. This problem is not so serious in the two-speaker reproduction. In the case of the four-speaker reproduction, however, a problem is caused in that the place where the microphone sound effect signal is to be localized (the vicinity of the midpoint of the front loudspeakers) is unnaturally different from where the microphone sound effect signal is actually localized (the midpoint of the four loudspeakers).

SUMMARY OF THE INVENTION

It is an object of the present invention to provide a karaoke apparatus which can solve the various problems of the conventional karaoke apparatus, and in which cancellation of a microphone signal by a microphone sound effect signal or a music signal is eliminated, the sound image localization of a microphone signal is stabilized, and various microphone sound effects are produced.

To achieve the above object, according to the first aspect of the present invention, there is provided a karaoke apparatus which comprises a microphone signal input terminal into which a microphone signal is input, a microphone sound effect generating circuit which generates a microphone sound effect signal such as an echo of the microphone signal, a music signal input terminal into which a music signal (accompaniment sound signal) is input, a combining circuit which combines the microphone sound effect signal output from the microphone sound effect generating circuit with the music signal, a microphone signal output terminal (center-signal output terminal), and a music signal output terminal from which an output signal from the combining circuit is output, and a signal path through which the microphone signal is supplied to the microphone signal output terminal, independently of the microphone sound effect signal.

In this configuration, the microphone signal, which includes of the voice of the singer, is output through only the microphone signal output terminal (center-signal output terminal), and the music signal and the microphone sound effect signal are output through only the music signal output terminal which is different from the microphone signal output terminal. Therefore, an output which corresponds to the microphone signal and which is an output signal from the microphone signal output terminal is not electrically affected by signal interference caused by the music signal and the microphone sound effect signal. Consequently, separation is not impaired, and the image localization is not made indefinite.

According to the second aspect of the present invention, preferably, the music signal output terminal has first and second output terminals through which at least signals that are to be reproduced from front right and left sides are output, respectively. The karaoke apparatus further comprises first and second loudspeaker reproduction systems which are respectively connected to the first and second output terminals, and a third loudspeaker reproduction system which is connected to the microphone signal output terminal, and a loudspeaker of the third loudspeaker reproduction system is placed substantially at a midpoint position between loudspeakers of the first and second loudspeaker reproduction systems.

According to this configuration, the music signal is output from both of the front loudspeakers which are placed at right front and left front positions, respectively, and the microphone signal is output from the center loudspeaker which is placed at a midpoint position between the front loudspeakers. In this case, the microphone signal and the microphone sound effect signal can be separated from each other electrically and in an acoustic space, and the above-mentioned improvement of the separation can be further enhanced.

In a karaoke apparatus, when the sound image localization of a microphone signal is outside the arrangement range of front loudspeakers, a sense of incongruity is auditorily caused. In contrast, in the present apparatus, the sound image is always localized at a midpoint position between the front loudspeakers, and hence the listener is entirely free from a sense of incongruity. A music signal is an accompaniment music signal. When the sound image of a microphone signal which is a vocal signal of the singer is localized at a midpoint position of the accompaniment music, easy listening is naturally attained. Of course, the state in which the accompaniment music and the microphone signal are heard from different places is abnormal. This is evident from the position of the singer in a television screen or a concert.

As described above, the microphone signal and the microphone sound effect signal are reproduced by different independent loudspeakers. Therefore, cancellation of the reproduced microphone signal by the reproduced microphone sound effect signal is fundamentally impossible from the viewpoint of the spatial acoustics. Consequently, the voice which is produced by the singer toward the microphone is output from the center loudspeaker, without any influence from the microphone sound effect signal and the like. Also, the sound image of the voice can be localized in the place where the center loudspeaker is disposed. The microphone sound effect signal includes an echo, reverberation, and the like. Even when the microphone sound effect signal is output from loudspeakers other than the center loudspeaker, it is possible to produce an auditory effect in which the microphone sound effect signal is sufficiently spatially widespread. In contrast, when the microphone sound effect signal is output only from the center loudspeaker, a high echo effect is not often attained. In the viewpoint of the operation principle, an echo is a "rebound" sound, which is a sound that has been spatially reflected from anywhere and then returned. When a reflected sound is heard only from one place, conversely, the sound effect is sensed to be unnatural.

According to the third aspect of the present invention, preferably, the karaoke apparatus is configured so that the microphone sound effect generating circuit can independently generate sound effect signals of plural channels.

In this configuration, it is possible to set the sound image localization of the microphone sound effect signal so as to be concentrated in an arbitrary place, rather than the geometric center of the loudspeakers. Consequently, karaoke can be enjoyed with the sound image of the microphone sound effect signal which is fit to the music piece, to be localized at an arbitrary position.

According to the fourth aspect of the present invention, preferably, the plural channels comprise front right and left channels and rear right and left channels.

According to the fifth aspect of the present invention, preferably, the microphone sound effect generating circuit outputs the microphone sound effect signal in one channel.

According to the sixth aspect of the present invention, preferably, the microphone sound effect generating circuit outputs the microphone sound effect signal in four channels.

According to the seventh aspect of the present invention, preferably, respective volumes of the four channels of the microphone sound effect signals can be set independently from each other.

According to the eighth aspect of the present invention, preferably, the microphone signal output terminal is a center-signal output terminal.

For clarity, the difference between the electrical signal addition and the spatial signal addition will be described below. In the electrical signal addition, when a certain sinusoidal wave is added to a waveform which is identical with the sinusoidal wave except that the phase is shifted therefrom by 180 degrees, the output becomes zero or is a signal which can never be heard as a sound. In spatial signal addition, when the sinusoidal wave is output from a certain loudspeaker and the 180 degree-shifted waveform is output from another loudspeaker, however, the waveforms are fundamentally recognized as two sounds. It is true that, depending on the locations of the loudspeakers or the listening point, there exists a point where sound waves respectively output from two loudspeakers cancel each other so as not to be heard as sounds. However, this occurs only at one restricted point, and never at other points.

Therefore, the electrical signal addition is largely different from the spatial signal addition. This difference causes effects of the additions to largely differentiate from each other.

In other words, in the present invention, it is critical to provide the electric circuit configuration of a karaoke apparatus with a sure separation configuration so that a microphone signal and a microphone sound effect signal do not electrically interfere with each other.

DETAILED DESCRIPTION OF THE PREFERRED EMBODIMENTS

Figure 1:
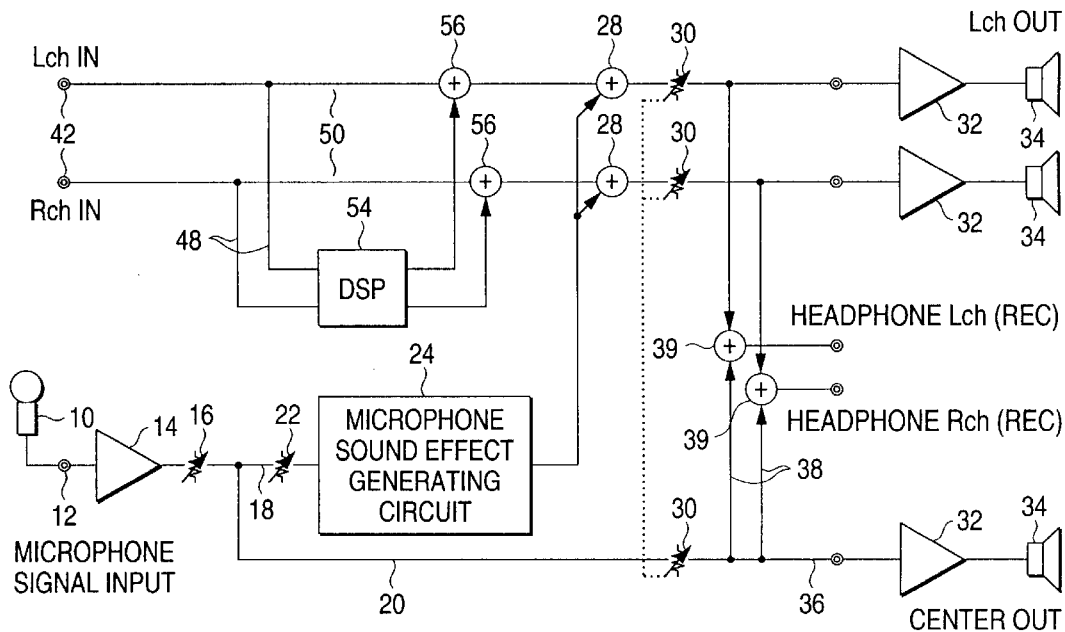
FIG. 1 is a diagram showing a signal processing system according to a first embodiment of the present invention.

A first embodiment in which the present invention is realized by a three-channel reproduction system consisting of front right, left, and center reproductions will be described. FIG. 1 is a system diagram of the signal processing system of the first embodiment. The figure shows the configuration which can conduct DSP processing on a music signal. However, DSP processing is not essential in the present invention.

A microphone signal which is output from a microphone 10 is input to a microphone signal input terminal 12, passed through a head amplifier 14, and then level-adjusted by a microphone volume controller 16. The level-adjusted microphone signal is branched into a microphone sound effect generation signal path 18 and a direct sound signal path 20. The microphone signal branched to the microphone sound effect generation signal path 18 is level-adjusted by a microphone sound effect volume controller 22, and then supplied to a microphone sound effect generating circuit 24, so that a microphone sound effect signal is generated.

A music signal which is input to a music signal input terminal 42 is branched into a field sound effect generation signal path 48 and a direct sound signal path 50. The music signal branched to the field sound effect generation signal path 48 is supplied to a DSP circuit 54 and a field sound effect signal (such as a reverberation field sound effect signal, or a sound image localization sound effect signal) is generated.

Combining circuits 56 additively combine the direct sound passing through the direct sound signal path 50 and the field sound effect signal generated by the DSP 54.

The microphone sound effect signal and all music signals output from the combining circuits 56 are additively combined together by combining circuits 28 for each of the left and right channels. The synthesized signals are level-adjusted by total volume controllers 30, and then amplified by amplifiers 32 to be reproduced from left and right loudspeakers 34.

The microphone signal (direct sound signal) branched to the direct sound signal path 20 is level-adjusted by another volume controller 30, and then branched into signal paths 38 leading to a headphone, and a signal path 36 leading to the center loudspeaker. The microphone signal branched to the signal path 36 leading to the center loudspeaker is amplified by another amplifier 32 to be reproduced from the center loudspeaker 34. The microphone signals branched to the signal paths 38 leading to the headphone are additively combined with all the music signals and the microphone sound effect signal by combining circuits 39, and then supplied to headphone output terminals.

According to this configuration, the microphone signal can be output without any influence from the microphone sound effect signal, the music signals, the field sound effect signals, and the like. As a result, it is possible to output a sound in which the separation is improved and the sound image localization is stabilized as compared with the conventional examples.

Figure 2:
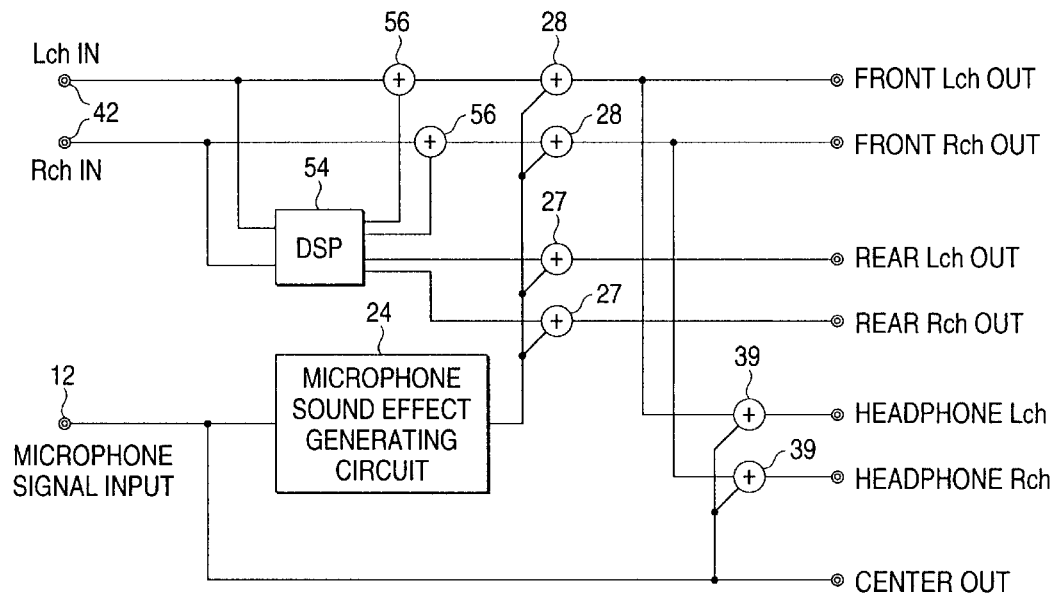
FIG. 2 is a diagram showing a signal processing system according to a second embodiment of the present invention.

A second embodiment in which the present invention is realized by a five-channel reproduction system will be described. FIG. 2 is a system diagram of the signal processing according to the second embodiment.

The second embodiment is different from the first embodiment in that the sound effect signal from the music signal is output to four channels by means of DSP processing. Specifically, the DSP 54 outputs sound effect signals for four channels in total, i.e., front right and left channels (two channels) and rear right and left channels (two channels). The front sound effect signals are additively combined with the music signals (direct sound signals) by the combining circuits 56. The rear sound effect signals are additively combined with the microphone sound effect signal, which is an output of the microphone sound effect generating circuit 24, by combining circuits 27, and the synthesized signals are then output. The microphone sound effect signal which is output from the microphone sound effect generating circuit 24 is also additively combined with the music signals by combining circuits 28.

According to this configuration, since the four-channel sound effect signals for the music signals are used, a sound is also reproduced from the rear side. Hence the listener can enjoy reproduction in various sound fields provided with rich presence. The microphone sound effect signal is additively combined with the front music signals and the rear music signal sound effect signals. In contrast, the microphone sound signal is independently supplied to the center loudspeaker, and hence is not affected by the microphone sound effect signal, the music signal sound effect signals, or the music signals. In FIG. 2, the microphone, the head amplifier, and the volume controllers, the amplifiers, the loudspeakers, are not shown.

Figure 3:
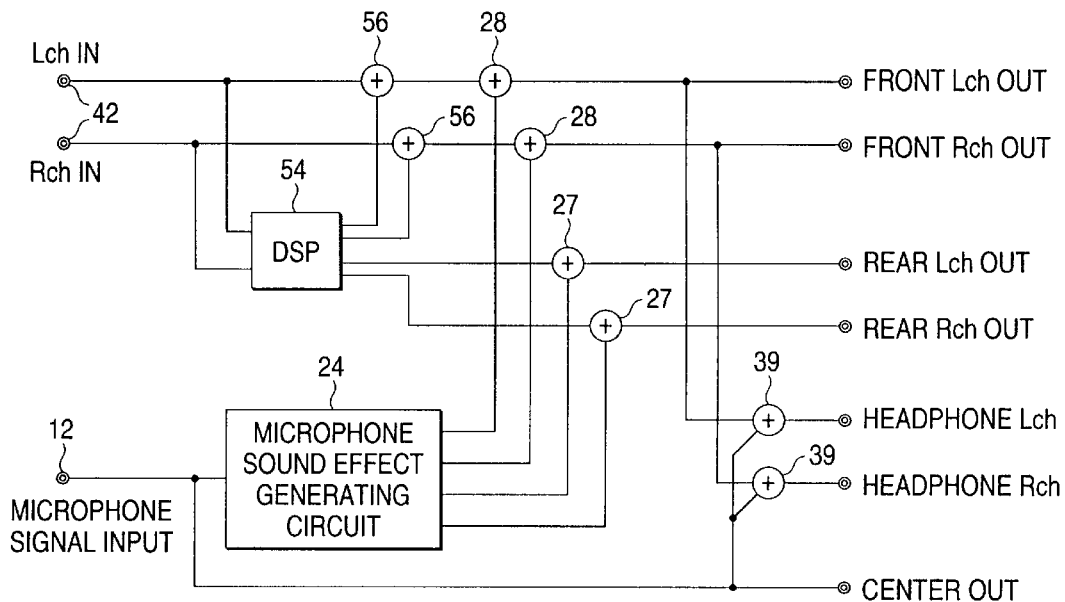
FIG. 3 is a diagram showing a signal processing system according to a third embodiment of the present invention.

A third embodiment of the present invention in which a microphone sound effect signal is output in four channels will be described. FIG. 3 is a system diagram of the signal processing system according to the third embodiment.

The third embodiment is different from the second embodiment in that the microphone sound effect signal is output not in one channel but in four channels. The four-channel microphone sound effect signals, which are output from the microphone sound effect generating circuit 24, are additively combined with the music signal sound effect signals and/or the music signals by the combining circuits 27 and 28, respectively.

In the second embodiment described above, only one kind of microphone sound effect signal is generated, and the microphone sound effect signal output from the front loudspeaker is strictly identical with that output from the rear loudspeakers. Therefore, there arises a problem in that the microphone sound effect signal is localized at the center of the plane which is defined by the four loudspeakers in total, i.e., the front two loudspeakers and the rear two loudspeakers. In contrast, according to the above-described configuration, the sound image of the microphone sound effect signals can be moved toward the front side, so that the microphone sound effect signals are auditorily easily heard.

Figure 4:
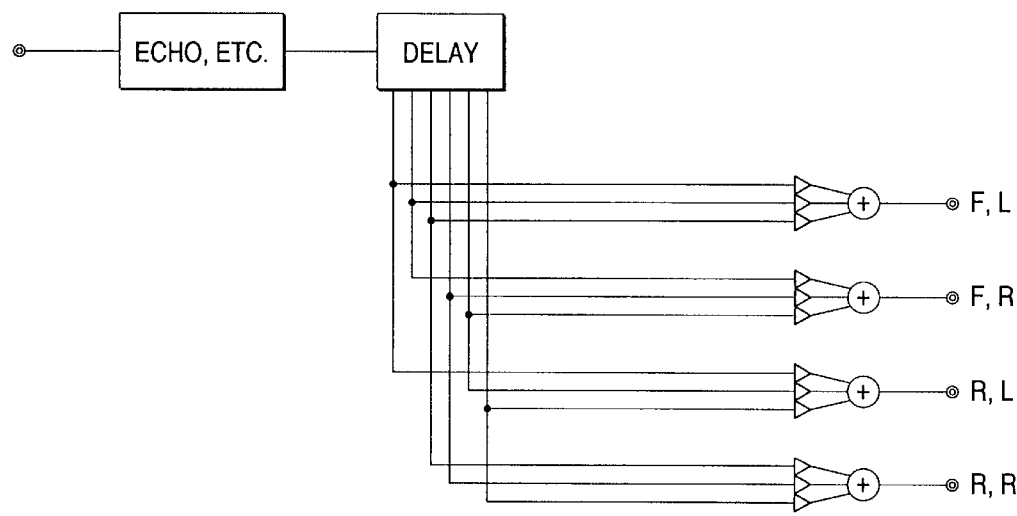
FIG. 4 is a signal system diagram showing the case where four-channel microphone sound effect signals are generated.
Figure 5:
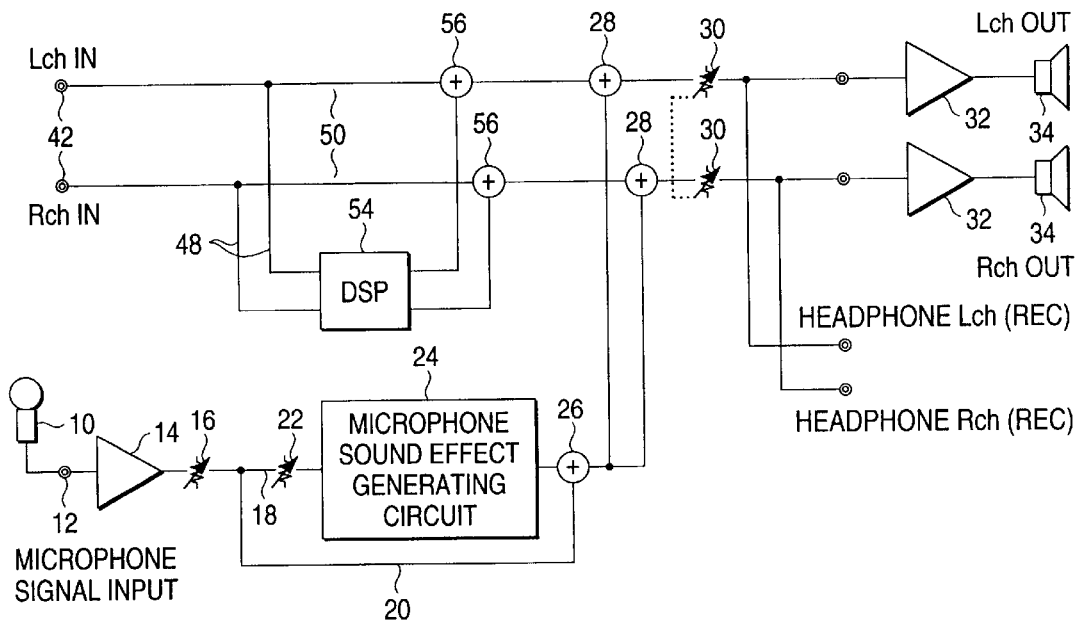
FIG. 5 shows a conventional karaoke apparatus in which two-channel reproduction is conducted.
Figure 6:
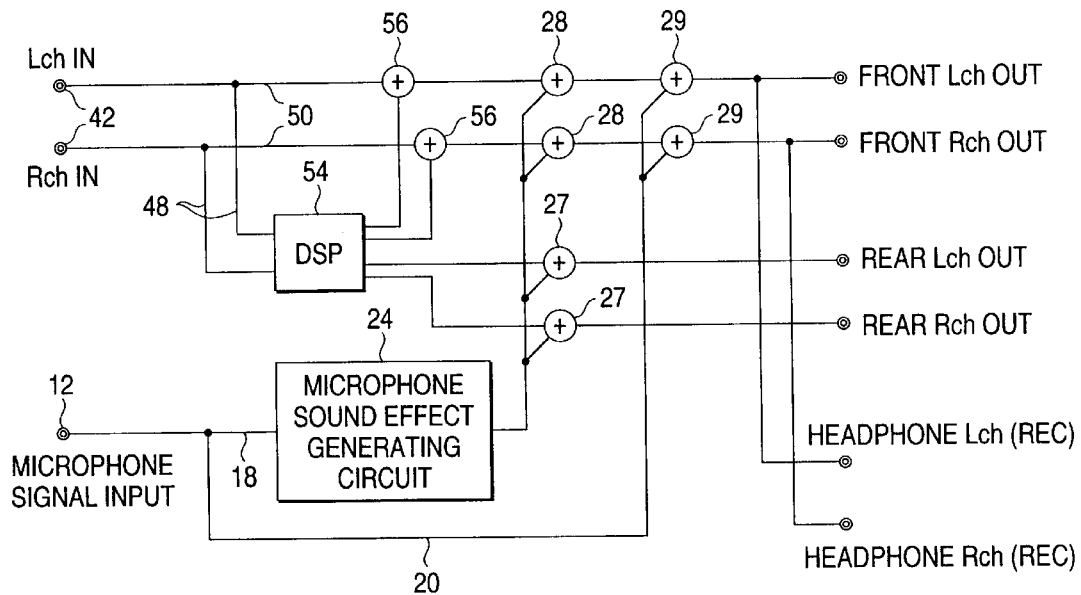
FIG. 6 shows conventional karaoke apparatus in which four-channel reproduction is conducted.

FIG. 4 shows a specific example of the configuration that outputs four-channel microphone sound effect signals.

In this example, a microphone sound effect signal such as an echo is generated from the input microphone sound. The generated microphone sound effect signal is supplied to a delay unit. Coefficients are applied to signals which are output from plural delay taps, respectively, to generate sound effect signals for four channels.

According to this configuration, the microphone sound effect signals are produced for four channels and the volumes can be set independently from each other, so that the sound image localization point of the microphone sound effect signals can be arbitrarily set. Consequently, it is possible to produce microphone sound effects which are rich in presence and fit together for various sound fields. Since the microphone direct signal sound is supplied to the center loudspeaker, the signal sound is not affected by the microphone sound effect signals, the music signal sound effect signals, or the music signals. In FIG. 3, the microphone, the head amplifier, the volume controllers, the amplifiers, and the loudspeakers, are not shown.

With respect to all of the embodiments described above, a karaoke apparatus in which a microphone signal can be switched by using a signal changeover switch to a path for adding the microphone signal to front channels, or to a path leading to a center loudspeaker, is also within the scope of the present invention.

What is claimed is:

1. A karaoke apparatus, comprising:
    a microphone signal input terminal into which a microphone signal is input;
    a microphone sound effect generating circuit which generates a microphone sound effect signal from the microphone signal;
    a music signal input terminal into which a music signal is input;
    a combining circuit which combines the microphone sound effect signal output from the microphone sound effect generating circuit with the music signal input through the music signal input terminal;
    a music signal output portion from which a first output signal from the combining circuit is output;
    a microphone signal output portion that outputs a second output signal based on the microphone signal, wherein the second output signal remains electrically independent from the microphone sound effect signal and the music signal after being outputted from the microphone signal output portion; and
    a signal path through which the microphone signal is supplied to the microphone signal output portion, the microphone signal being electrically independent of the microphone sound effect signal in the signal path.

2. A karaoke apparatus according to claim 1, wherein
    the music signal output portion has first and second output terminals through which at least signals that are to be reproduced from right and left sides are output, respectively,
    the first and second output terminals are respectively connected to first and second loudspeaker reproduction systems, which are independent of each other,
    the microphone signal output portion is connected to a third loudspeaker reproduction system, which is different from the first and second loudspeaker reproduction systems, and
    a loudspeaker of the third loudspeaker reproduction system is placed substantially at a midpoint position between loudspeakers of the first and second loudspeaker reproduction systems.

3. A karaoke apparatus according to claim 1, wherein the microphone sound effect generating circuit independently generates sound effect signals of plural channels.

4. A karaoke apparatus according to claim 3, wherein the plural channels comprise front right and left channels and rear right and left channels.

5. A karaoke apparatus according to claim 1, wherein the microphone sound effect generating circuit outputs the microphone sound effect signal in one channel.

6. A karaoke apparatus according to claim 1, wherein the microphone sound effect generating circuit outputs the microphone sound effect signal in four channels.

7. A karaoke apparatus according to claim 6, wherein respective volumes of the four channels of the microphone sound effect signals can be set independently from each other.

8. A karaoke apparatus according to claim 1, wherein the microphone signal output portion is a center-signal output terminal.

9. A karaoke apparatus, comprising:
    a microphone signal input terminal into which a microphone signal is input;

a branch circuit at which the microphone signal is distributed into a first microphone signal and a second microphone signal;

a microphone sound effect generating circuit which generates a microphone sound effect signal based on the first microphone signal;

a music signal input terminal into which a music signal is input;

a combining circuit which combines the microphone sound effect signal output from the microphone sound effect generating circuit with the music signal input through the music signal input terminal;

a music signal output portion from which an output signal from the combining circuit is output; and a microphone signal output portion from which the second microphone signal is output independently of the microphone sound effect signal, and to which a loudspeaker is connectable through an amplifier, wherein only the second microphone signal is reproduced by the loudspeaker as a corresponding microphone sound.

10. A karaoke apparatus according to claim 9, further comprising first, second and third loudspeaker reproductions, wherein the music signal output portion has first and second output terminals through which at least signals that are to be reproduced from right and left sides are output, respectively, the first and second output terminals being respectively connected to first and second loudspeaker reproduction systems, which are independent of each other, the third loudspeaker reproduction system, which is different from the first and second loudspeaker reproduction systems, includes the loudspeaker and the amplifier, and the loudspeaker of the third loudspeaker reproduction system is placed substantially at a midpoint position between the loudspeakers of the first and second loudspeaker reproduction systems.

11. A karaoke apparatus according to claim 9, wherein the microphone sound effect generating circuit independently generates sound effect signals of plural channels.

12. A karaoke apparatus according to claim 11, wherein the plural channels include front right and left channels and rear right and left channels.

13. A karaoke apparatus according to claim 9, wherein the microphone sound effect generating circuit outputs the microphone sound effect signal in one channel.

14. A karaoke apparatus according to claim 9, wherein the microphone sound effect generating circuit outputs the microphone sound effect signal in four channels.

15. A karaoke apparatus according to claim 14, wherein respective volumes of the four channels of the microphone sound effect signals can be set independently from each other.

16. A karaoke apparatus according to claim 9, wherein the microphone signal output portion has a center-signal output terminal.

17. A karaoke apparatus according to claim 9, further comprising a loudspeaker reproduction system to which the music signal output portion is connected, and by which only the output signal from the combining circuit is reproduced as a sound.

18. A karaoke apparatus, comprising:

a microphone signal input terminal into which a microphone signal is input;

a microphone sound effect generating circuit which generates a microphone sound effect signal based on the microphone signal;

a music signal input terminal into which a music signal is input;

a combining circuit which combines the microphone sound effect signal output from the microphone sound effect generating circuit with the music signal input through the music signal input terminal;

a music signal output portion from which an output signal from the combining circuit is output; and a microphone signal output portion that outputs a second output signal based on the microphone signal; and a signal path through which the microphone signal is supplied to the microphone signal output portion, the microphone signal being electrically independent of the microphone sound effect signal in the signal path.

* * * * *